(12) United States Patent
Potyrailo

(10) Patent No.: US 11,567,020 B2
(45) Date of Patent: Jan. 31, 2023

(54) GAS SENSING ASSEMBLY AND METHOD

(71) Applicant: General Electric Company, Schenectady, NY (US)

(72) Inventor: Radislav Alexandrovich Potyrailo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 598 days.

(21) Appl. No.: 16/600,520

(22) Filed: Oct. 13, 2019

(65) Prior Publication Data

US 2021/0109049 A1   Apr. 15, 2021

(51) Int. Cl.
G01N 27/06 (2006.01)
G01N 27/02 (2006.01)
G01N 27/12 (2006.01)

(52) U.S. Cl.
CPC ......... *G01N 27/026* (2013.01); *G01N 27/125* (2013.01); *G01N 27/06* (2013.01)

(58) Field of Classification Search
CPC .... G01N 27/026; G01N 27/125; G01N 27/06; G01N 27/12
See application file for complete search history.

(56) References Cited

U.S. PATENT DOCUMENTS

| | | | |
|---|---|---|---|
| 6,500,547 B1 | 12/2002 | Potyrailo | |
| 7,489,835 B1 | 2/2009 | Xia et al. | |
| 8,990,025 B2 | 3/2015 | Potyrailo et al. | |
| 9,097,639 B2 | 8/2015 | Potyrailo et al. | |
| 9,261,474 B2 | 2/2016 | Potyrailo et al. | |
| 9,538,657 B2 | 1/2017 | Potyrailo et al. | |
| 9,557,285 B2 | 1/2017 | Gole | |

(Continued)

FOREIGN PATENT DOCUMENTS

| | | | |
|---|---|---|---|
| CN | 105388937 | 9/2017 | |
| JP | 6035628 | 11/2016 | |
| WO | WO-2018053655 A1 * | 3/2018 | ........... G01N 27/125 |

OTHER PUBLICATIONS

Potyrailo et al., A passive radio-frequency identification (RFID) gas sensor with self-correction against fluctuations of ambient temperature, vol. 185, Aug. 2013, pp. 587-593 (Year: 2013).*

(Continued)

*Primary Examiner* — Joshua L Allen
*Assistant Examiner* — Shizhi Qian
(74) *Attorney, Agent, or Firm* — Fletcher Yoder, P.C.

(57) ABSTRACT

A gas sensing assembly includes a sensing material to be placed in contact with a fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at an elevated alternating current frequency range. The sensing circuitry measures one or more electrical responses of the sensing material responsive to applying the electric field at the alternating current frequency range and at the elevated alternating current frequency range. The sensing circuitry detects presence of a gas in the fluid sample based on the one or more electrical responses.

15 Claims, 9 Drawing Sheets

(56) References Cited

U.S. PATENT DOCUMENTS

| | | | |
|---|---|---|---|
| 10,191,002 B2 | 1/2019 | Wouters | |
| 2002/0173040 A1 | 11/2002 | Potyrailo et al. | |
| 2005/0145493 A1* | 7/2005 | Saffell | G01N 33/004 204/431 |
| 2012/0131909 A1* | 5/2012 | Maeda | G01N 27/4175 60/276 |
| 2014/0182363 A1* | 7/2014 | Potyrailo | G01N 27/026 73/64.53 |
| 2016/0290961 A1* | 10/2016 | Aoki | F01N 11/00 |
| 2018/0080890 A1 | 3/2018 | Potyrailo et al. | |
| 2018/0231485 A1* | 8/2018 | Potyrailo | G01N 33/0047 |
| 2019/0234896 A1 | 8/2019 | Andersson et al. | |
| 2019/0250135 A1 | 8/2019 | Andersson et al. | |

OTHER PUBLICATIONS

Thorsten Graunke et al, "Towards Enhanced Gas Sensor Performance with Fluoropolymer Membranes", Sensors 2016, pp. 1-20.

Eva Fritzsche, et al, "Highly sensitive poisoning-resistant optical carbon dioxide sensors for environmental monitoring", The Royal Society of Chemistry 2017, pp. 55-65.

J.P. Viricelle et al, "Selectivity improvement of semi-conducting gas sensors by selective filter for atmospheric pollutants detection", Science and Engineering C 26 (2006), pp. 186-195.

M. Schweizer-Berberich et al, "Filters for tin dioxide CO gas sensors to pass the UL2034 standard", Sensors and Actuators B 66 (2000), pp. 34-36.

Potyrailo et al., "A Passive Radio-Frequency Identification (RFID) Gas Sensor With Self-Correction Against Fluctuations of Ambient Temperature", Sensors and Actuators B Chemical, vol. 185 pp. 587-593.

Abidin et al, "Comparative Study of Drift Compensation Methods for Environmental Gas Sensors", IOP Conference Series: Earth and Environmental Science 2018, vol. 117, pp. 1-6.

Tsujita et al, "Dynamic gas sensor network for air pollution monitoring and its auto-calibration", Sensors Oct. 24-27, 2004, pp. 56-59.

\* cited by examiner

GAS SENSING ASSEMBLY AND METHOD

GOVERNMENT LICENSE RIGHTS

This invention was made with government support under contract 75D30118C02617 awarded by the National Institute For Occupation Safety and Health. The government has certain rights in the invention.

FIELD

One or more embodiments are disclosed that relate to gas sensing assemblies and methods for sensing gases.

BACKGROUND

Effects of ambient temperature on the performance of gas sensors represents a significant well known and accepted limitation against expanding gas sensors for industrial and consumer applications where accuracy is critical across different temperatures. To address this problem, supplementary temperature sensors are implemented with their outputs included in the gas-calibration functions. Metal oxide semiconductor (MOS) sensors with their resistance readout are common sensors because of the ability to detect numerous gases by the careful selection of the base semiconductor material and the doping of the base semiconductor material. Unfortunately, the sensitivity of conventional MOS sensors with their resistance readout to ambient temperature is well known and requires a correction using known methods to utilize dedicated temperature sensors. For example, a separate temperature sensor may be used in tandem with a MOS gas sensor.

Furthermore, impedance measurements of MOS sensors allow multi-gas sensor responses with improved limit of detection and improved response linearity as compared with a resistor readout of the MOS sensor. However, known impedance methods fail to teach how to solve the temperature effect problem without adding a separate temperature sensor.

BRIEF DESCRIPTION

In one or more embodiments, a gas sensing assembly includes a sensing material to be placed in contact with a fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at an elevated alternating current frequency range. The sensing circuitry measures one or more electrical responses of the sensing material responsive to applying the electric field at the alternating current frequency range and at the elevated alternating current frequency range. The sensing circuitry detects presence of a gas in the fluid sample based on the one or more electrical responses.

In another embodiment, a method includes placing a sensing material into contact with a fluid sample. A temperature of the sensing material is controlled via a heating element while the sensing material is in contact with the fluid sample. An electric field is applied to the sensing material via the electrodes at an elevated alternating current frequency range. One or more electrical responses of the sensing material are measured responsive to applying the electric field at the alternating current frequency range and at the elevated alternating current frequency range. The presence of a gas in the fluid sample is detected based on the one or more electrical responses.

In another embodiment, a method includes placing a sensing material into contact with a fluid sample. A temperature of the sensing material is controlled via a heating element while the sensing material is in contact with the fluid sample. An electric field is applied to the sensing material via the electrodes at an elevated alternating current frequency range. One or more electrical responses of the sensing material are measured responsive to applying the electric field at the alternating current frequency range and at the elevated alternating current frequency range. A concentration of the gas in the fluid sample is measured based on the one or more electrical responses.

In another embodiment, a gas sensing assembly includes a sensing material to be placed in contact with a fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at a first alternating current frequency range in the presence of an uncontrolled ambient temperature, and at a second alternating current frequency range. The sensing circuitry measures one or more electrical responses of the sensing material responsive to applying the electric field at the first and second alternating current frequency ranges. The sensing circuitry detects presence of a gas in the fluid sample based on the one or more electrical responses.

In another embodiment, a gas sensing assembly includes a sensing material to be placed in contact with a fluid sample, a gas-permeable filter material separating the sensing material and the fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at a first alternating current frequency range in the presence of an uncontrolled ambient temperature, and at a second alternating current frequency range. The sensing circuitry measures one or more electrical responses of the sensing material responsive to applying the electric field at the first and second alternating current frequency ranges. The sensing circuitry detects presence of a gas in the fluid sample based on the one or more electrical responses.

DETAILED DESCRIPTION

Figure 1:
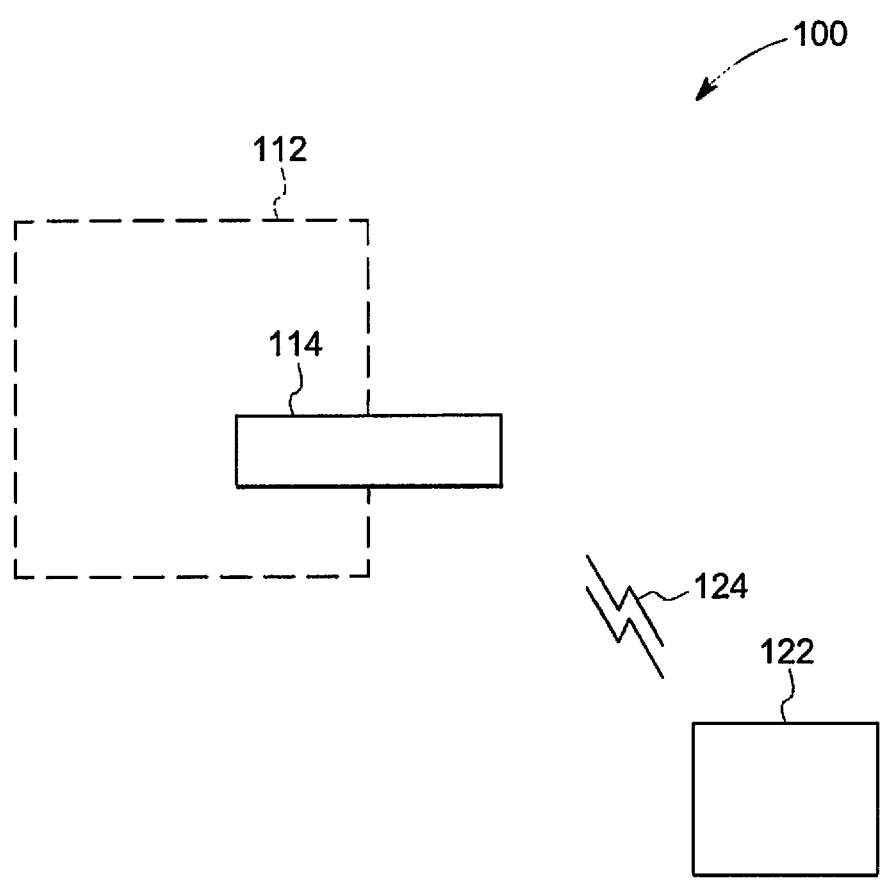
FIG. 1 illustrates a gas sensing assembly in accordance with one embodiment.

One or more embodiments of the inventive subject matter described herein provide systems and methods that provide gas sensing that does not require a separate temperature sensor to measure and to correct for fluctuations in ambient temperature. The gas sensing assemblies and methods include a sensing material that is placed into contact with a fluid sample. Electrodes coupled with the sensing material apply an electric field to the sensing material across the electrodes. A heating element controls a temperature of the sensing material while the sensing material is in contact with the fluid sample. The gas sensing assemblies and methods include sensing circuitry having one or more processors that control the application of the electric field to the sensing material via the electrodes at an alternating current frequency range and at an elevated alternating current frequency range in the presence an uncontrolled ambient temperature. The sensing circuitry measures one or more electrical responses of the sensing material responsive to applying the electric field at the alternating current frequency range and at the elevated alternating current frequency range. The sensing circuitry detects the presence of a gas in the fluid sample based on the one or more electrical responses.

Alternatively, the sensing circuitry can measure one or more electrical responses of the sensing material responsive to applying the electric field at a first alternating current frequency range and at a second alternating current frequency range, where the first alternating current frequency range is higher or greater than the second alternating current frequency range.

Alternatively, the sensing circuitry can measure one or more electrical responses of the sensing material responsive to applying the electric field at the first alternating current frequency range and at the second alternating current frequency range, where the first alternating current frequency range is lower or less than the second alternating current frequency range.

The one or more processors may be defined as a signal-processor and/or a control element of the gas sensing assembly. The gas sensing assembly may be defined as a measurement system that includes components assembled together (physically, conductively, or the like) to achieve the function of sensing at least one gas analyte.

The one or more processors of the gas sensing assembly measure a first electrical response of the sensing material to the alternating current frequency range applied to the sensing material. The first electrical response may not be affected by the uncontrolled ambient temperature. The one or more processors control application of the electric field to the sensing material via the electrodes at a high-frequency shoulder of a dielectric relaxation spectrum. Optionally, the one or more processors may measure a real part of an impedance of the first electrical response at the high-frequency shoulder of the dielectric relaxation spectrum. The one or more processors may also measure a second electrical response of the sensing material. The second electrical response may not be affected by the gas but may be affected by the uncontrolled ambient temperature. Optionally, the one or more processors may also measure a third electrical response of the sensing material. The third electrical response to the gas may be substantially linear and may be proportional to the uncontrolled ambient temperature. Alternatively, in one or more embodiments, the one or more processors may control application of the electric field to the sensing material via the electrodes at a low-frequency shoulder of a dielectric relaxation spectrum.

The effects of ambient temperature on gas sensors based on resistance detection remain an unsolved problem dramatically reducing sensor accuracy and adding complications in sensor calibrations. Dielectric excitation provided a solution for self-compensation against variable ambient temperature. This observed temperature self-compensation effect may be the result of the differences in frequency-dependent temperature dependence of dielectric properties of the electrical circuit components of the sensor with nonlimiting examples that include sensing material, substrate, electrodes, and other circuit components. Systems components with different temperature coefficients can be implemented with the goals to enhance or to further eliminate temperature sensitivity in sensors. In these designs, at certain operating conditions, the components substantially cancel out the overall temperature effects for the whole sensor system.

At least one technical effect of the various embodiments herein can provide a method for gas sensing with a single gas sensor or gas sensor assembly that does not require a separate temperature sensor to measure and/or to correct for the fluctuations in ambient temperature. For example, the gas sensing assembly may measure one or more electrical responses, such as the complex impedance responses at elevated discrete frequencies and/or elevated frequency ranges of the gas sensor dielectric relaxation spectrum to where the impedance responses may predictably be affected by the ambient temperature and is not affected by the concentration of the measured gas. The desired gas sensor characteristic may be used to measure temperature and to provide a self-correction for temperature effects of the gas response of the sensor. For example, the gas sensing assemblies and methods described herein may provide for gas concentration measurements, temperature measurements, and self-correction for temperature effects using a single gas sensing assembly.

FIG. 1 illustrates one embodiment of a sensor system 100. The system 100 examines a fluid in contact with the system 100. The fluid may be a gas, a liquid, a gas-liquid mixture, a solid, particles or particulate matter, or the like, containing one or more analyte gases therein. The fluid may be transformer oil or any insulating fluid of an electrical transformer that is installed and/or disposed of below a ground level, above the ground level, near to the ground level, or any other position. In another embodiment, the fluid may be a gas or fuel, such as a hydrocarbon-based fuel. One example of the fluid is natural gas that is supplied to a powered system (e.g., a vehicle, or a stationary generator set) for consumption. Other examples of such a fluid can include gasoline, diesel fuel, jet fuel or kerosene, bio-fuels, petrodiesel-biodiesel fuel blends, natural gas (liquid or compressed), and fuel oils. Another example of the fluid is indoor or outdoor ambient air. Another example of the fluid is air at an industrial, residential, military, construction, urban, and any other known site. Another example of the fluid is ambient air with relatively small concentrations of hydrocarbons and/or other pollutants. Another example of the fluid is at least one gas dissolved in an industrial liquid such as transformer oil, bioprocess media, fermentation media, wastewater, and any other. Another example of the fluid is the at least one gas dissolved in a consumer liquid such as milk, non-alcoholic beverages, alcoholic beverages, cosmetics, and any other. Another example of the fluid is at least one gas dissolved in a body liquid such as blood, sweat, tears, saliva, urine, and any other.

The system 100 may include a fluid reservoir 112 for holding the fluid and a gas sensing assembly 114 at least partially disposed in, on, or within the fluid reservoir 112. The gas sensing assembly 114 may also be referred to herein as a gas sensor or sensor. Alternatively, the assembly 114 may be set in a flow path of the fluid outside of the reservoir 112, such as coupled to in-line connectors in fluid communication with the fluid reservoir that define a flow path. The gas sensing assembly 114 may be a multivariable gas sensor with at least two or more outputs that are substantially independent of each other output. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., a stadium, a gas-production site, a seashore, a forest, or the like). In one embodiment, the gas sensing assembly 114 may provide continuous monitoring of the fluid within the reservoir or flow path. In one or more embodiments, the assembly 114 may be an impedance gas sensor, an electromagnetic sensor, a photonic sensor, an electronic sensor, a hybrid sensor, or another type of sensor. Optionally, the multivariable gas sensor may be a sensor array.

Figure 2:
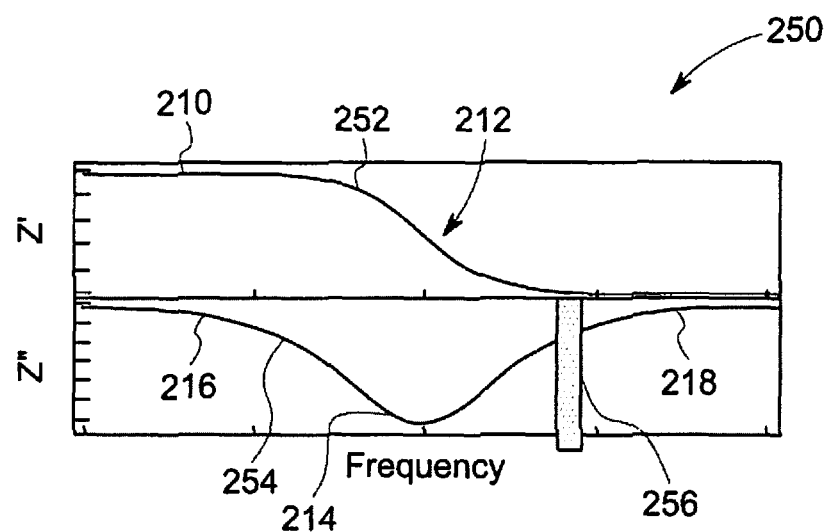
FIG. 2 illustrates a graph of a measured response corresponding to an impedance response of a gas sensing assembly at a first frequency, in accordance with one embodiment.

The sensor 114 may detect characteristics or properties of the fluid via a resonant or non-resonant impedance spectral response. In one or more embodiments, one or more inductor-capacitor-resistor resonant circuits (LCR resonators) of the sensor 114 may measure the resonant impedance spectral response of the sensor. A non-resonant impedance spectral response is measured when the circuit does not contain an inductor. For example, FIG. 2 illustrates a graph 250 of a measured response corresponding to a non-resonance impedance response of a gas sensing assembly, in accordance with one embodiment. The non-resonant impedance spectrum of the assembly 114 in proximity to the fluid varies based on sample composition and/or components and/or temperature. The measured resonant or non-resonant impedance values Z' 252 (which may be the real part of impedance, Zre) and Z" 254 (which may be the imaginary part of impedance, Zim) reflect the response of the sensor 114 to the fluid.

At low frequencies, a sensing material may exhibit a high value of Z', as illustrated by region 210, followed by a gradual relaxation of Z' to zero as a function of frequency, as illustrated by region 212. A relaxation peak exists in the Z" spectrum with its minimum at the relaxation frequency, as illustrated by region 214. The Z" spectrum also exhibits its relaxation to zero as a function of frequency. This relaxation to zero is a function of decreasing frequency, as illustrated by region 216, and is a function of increasing frequency, as illustrated by region 218.

MOS sensor operation at one or more predetermined alternating current frequency ranges is termed herein a dielectric excitation measurement strategy for MOS sensors. In this dielectric excitation measurement strategy, a gas-modulated high-frequency and/or low-frequency Z" shoulder of the MOS material dielectric relaxation peak is followed. The high-frequency and/or low frequency Z" shoulder are selected based on types of gases that are measured (reducing or oxidizing gases) and types of MOS materials that are utilized in the sensor (e.g., n-type and/or p-type semiconductors). For example, for monitoring of reducing gases with an n-type MOS material, a high-frequency Z" shoulder of the MOS material dielectric relaxation peak can be selected. For monitoring of oxidizing gases with an n-type MOS material, a low-frequency Z" shoulder of the MOS material dielectric relaxation peak can be selected. For monitoring of reducing gases with a p-type MOS material, a low-frequency Z" shoulder of the MOS material dielectric relaxation peak can be selected. For monitoring of oxidizing gases with a p-type MOS material, a high-frequency Z" shoulder of the MOS material dielectric relaxation peak can be selected.

Returning to FIG. 1, the system 100 may include one or more sensing circuits having one or more processors that may measure an electrical response to the sensing system 100 to an alternating electrical current applied to the sensing system at one or more of: (a) one or more different frequencies, or (b) one or more different resistor-capacitor configurations of the system 100.

Optionally, other embodiments of the inventive subject matter described herein include other designs of sensors besides resonant and non-resonant impedance sensors. Other sensors can be capacitor sensors, electro-mechanical resonator sensors (e.g., tuning forks, cantilever sensors, acoustic device sensors), thermal sensors, optical sensors, acoustic sensors, photoacoustic sensors, near-infrared sensors, ultraviolet sensors, infrared sensors, visible light sensors, fiber-optic sensors, reflection sensors, multivariable sensors, or single-output sensors. The sensor may generate electrical or optical stimuli in response to measured gas in ambient air at an industrial, residential, military, construction, urban, and any other known site or in measured gas in transformer oil or in isolating fluid. The insulating fluid of an electrical transformer may be insulating oil, mineral oil, synthetic oil, vegetable oil, and any other appropriate insulating fluid.

The measured fluids may be gases of different origin. Nonlimiting examples of the origin of gases include emissions from humans, industrial emissions, biogenic emissions, thermogenic emissions, agricultural emissions, volatile by-products of metabolic processes of humans and animals, volatile emissions from solvents, volatile products of volatilization of particles, volatile products of sublimation of materials, volatile products of combustion of materials, or the like.

An electrical field may be applied to a sensing material or sensing film of the sensor 114 across the electrodes. The distance between the electrodes and the electrodes geometry as well as the applied periodic voltage to the electrodes, may define the magnitude of the electric field applied to the sensor 114 (e.g., to the sensing material or film). The electrodes may be in direct contact with the sensing material. For example, the sensor 114 may be a combination of a sensing region and associated circuits and/or the sensing region may be coated with the sensing material. The sensing material may be semiconductor material, a metal oxide material, a nanocomposite material or nanomaterial having grain sizes ranging from about 0.1 nanometer to about 100 nanometers or to about 999 nanometers, or a mesomaterial having grain sizes ranging from about one micrometer to about ten micrometers or to about 999 micrometers. Nanomaterials can be in the form of nanoparticles, nanowires, nanotubes, nanobelts, nanosheets, and nanocubes. Nonlimiting examples of metal oxides for gas sensors include single-metal oxides (e.g., $ZnO$, $CuO$, $CoO$, $SnO_2$, $TiO_2$, $ZrO_2$, $CeO_2$, $WO_3$, $MoO_3$, $In_2O_3$) and perovskite oxides structures with two differently sized cations (e.g., $SrTiO_3$, $CaTiO_3$, $BaTiO_3$, $LaFeO_3$, $LaCoO_3$, $SmFeO_3$). Nonlimiting examples of metal oxides for gas sensors include n-type and p-type metal oxide semiconductors. Nonlimiting examples of n-type metal oxide semiconductors include $WO_3$ and $SnO_2$. Nonlimiting examples of p-type metal oxide semiconductors include $CuO$, $NiO$, $Cr_2O_3$, $Co_3O_4$, and $Mn_3O_4$.

When a conventional sensor operates over the broad range of ambient temperatures and gas types, the sensor can be undesirably affected by different gases in the environment. Additionally, such a sensor over its operational life can be in different states such as powered OFF and powered ON. When the sensor is powered OFF, it can be affected by the condensation of moisture on the sensor surface. Such settled moisture or other gases or contaminants can undesirably affect the surface of the sensor by forming cracks and other types of damaged areas on the sensor surface.

In one or more embodiments, the gas sensing assembly may include a gas-permeable filter material separating a sensing material of the sensor 114 and the fluid sample. The use of filter materials that protect the surface of the sensor can be utilized to protect the sensor material from mechanical and chemical irreversible damage. Known types of filter materials include zeolites, metal-oxide film filters, charcoal filters, polymeric filters, nanoporous filters, and many others. Polymeric filter materials, such as polymers of Hyflon, Cytop, Teflon AF, can be utilized to protect the sensing film. Perfluorinated polymers that have the ability to prevent condensed liquid water droplets from affecting the surface of the sensing element by preventing water from being diffused through the polymer film and not to interact with the metal oxide sensing material. In operation, the MOS sensor operates at the desired operation temperature that does not exceed the glass transition temperature or degradation temperature of the polymer filter material.

Teflon AF films have been utilized in U.S. Pat. No. 6,500,547 titled "Coating Materials For Sensors And Monitoring Systems, Methods for Detecting Using Sensors and Monitoring Systems," and U.S. Patent Application Publication Number 2002/0173040 titled "Chemically-resistant Sensor Devices, and Systems and Methods for Using Same" to prevent the sensor from being affected by the chemical in ambient environment. Selective permeability of these polymers can be based on size exclusion. Teflon AF can be utilized to allow selective diffusion of small nonionic species over ionic species and relatively large nonionic species. Copolymers can be designed with selective hydrophobic and/or hydrophilic diffusion preferences. Teflon AF polymers have been described as protective layers over sensing materials in U.S. Pat. No. 9,097,639 titled "Systems for Analysis of Fluids," and U.S. Pat. No. 9,261,474 titled "Methods for Analysis of Fluids." The present invention utilizes perfluorinated polymers to prevent condensed liquid water droplets on the surface of the sensing element at different ambient temperatures from wetting the MOS sensing material and damaging the MOS sensing material.

Alternatively, the present invention utilizes perfluorinated polymers to prevent undesired gas-phase chemicals from mechanically and/or chemically damaging the MOS sensing material.

Suitable sensors may include single use or multi-use sensors. A suitable multi-use sensor may be a re-usable sensor that may be used during the lifetime of a system in which it may be incorporated into. In one embodiment, the sensor may be a single use sensor that may be used during all or part of a reaction or process.

Data from the sensor 114 may be acquired via data acquisition circuitry, which may be associated with the sensor or which may be associated with a control system, such as a controller or workstation 122 including data processing circuitry, where additional processing and analysis may be performed. The controller or workstation 122 may include one or more wireless or wired components, and may also communicate with the other components of the system 100. Suitable communication models include wireless, such as bi-directional communication link 124, or wired. At least one suitable wireless model includes radio frequency devices, such as radio frequency identification (RFID) wireless communications. Other wireless communication modalities may be used based on application specific parameters. Nonlimiting examples include near field communication (NFC), Bluetooth, Wi-Fi, 3G, 4G, 5G, and others. For example, where there may be electromagnetic field (EMF) interference, certain modalities may work where others may not. The data acquisition circuitry optionally can be disposed within the sensor 114. Other suitable locations may include disposition being within the workstation 122. Further, the workstation 122 can be replaced with a control system of the whole process where the sensor and its data acquisition circuitry may be connected to the control system of the whole process.

Additionally, the data acquisition circuitry may receive data from one or more sensors 114 (e.g., multiple sensors positioned at different locations in or around the fluid reservoir), one or more different sensors 114 disposed within or outside of the fluid reservoir 112, or the like. The data may be stored in short term and/or long term memory storage devices, such as archiving communication systems, which may be located within or remote from the sensor and/or reconstructed and displayed for an operator, such as at the operator workstation. The sensors 114 may be positioned on or in oil fluid reservoirs, associated piping components, connectors, flow-through components, and any other relevant process components.

The data acquisition circuitry may include one or more processors for analyzing the data received from the sensor 114. For example, the one or more processors may be one or more computer processors, controllers (e.g., microcontrollers), or other logic-based devices that perform operations based on one or more sets of instructions (e.g., software). The instructions on which the one or more processors operate may be stored on a tangible and non-transitory computer readable storage medium, such as a memory device. The one or more processors may determine that the single output and/or multiple outputs may match, partially match, or be within a predetermined range of known standard digital protocols of wireless communications.

In addition to displaying the data, the operator workstation 122 may control the above-described operations and functions of the system 100. The operator workstation 122 may include one or more processor-based components, such as general purpose or application-specific computers or processors. In addition to the processor-based components, the computer may include various memory and/or storage components including magnetic and optical mass storage devices, internal memory, such as RAM chips. The memory and/or storage components may be used for storing programs and routines for performing the techniques described herein that may be executed by the operator workstation 122 or by associated components of the system 100. Alternatively, the programs and routines may be stored on a computer accessible storage and/or memory remote from the operator workstation 122 but accessible by network and/or communication interfaces present on the computer of the workstation. The computer may also comprise various input/output (I/O) interfaces, as well as various network or communication interfaces. The various I/O interfaces may allow communication with user interface devices, such as a display, keyboard, electronic mouse, and printer, that may be used for viewing and inputting configuration information and/or for operating the imaging system. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

In one or more embodiments, the sensor 114 may be a wearable chip assembly, may be held within a wearable and/or non-wearable transferrable object (e.g., a frame of military or industrial eyeglasses), or the like. The wearable device may be worn by a subject (e.g., a human, any mammal subject, a plant subject, or the like), may be removably coupled or integrated with an article worn by a subject (e.g., a shirt, pants, safety vest, safety personal protection clothing, eyeglasses, hat, helmet, hearing device, or the like), or may be any alternative device that may be transferrable such that sensor can be moved between different positions, may be stationary or substantially stationary, or the like. Optionally, the sensor 114 may be disposed on and/or within an unmanned vehicle (UMV) or may be used to monitor environments with unmanned platforms, such as aerial, ground-based, above-ground-based, under-ground-based, under-water-based, and other platforms.

Non-limiting examples of incorporation of the gas sensing assembly 114 into an industrial or consumer infrastructure or components may include stationary industrial infrastructure, moving industrial infrastructure, roads, buildings, bridges, vehicles, wind power turbines, wind power turbine blades, aircraft engines, single-use and multiple use bioprocess components, oil drill bits, pipelines, consumer products, wireless computers, mobile computers, cradles of mobile devices, cases of mobile devices, cases of goods, smartphones, tablets, personal digital assistants, watches, industrial remote control units, consumer remote control units, television remote control units, home remote control units, home appliances, consumer appliances, clothing, footwear, helmets, sports equipment, laboratory equipment, laboratory analytical instrumentation, filters, filter cartridges, separators, separation columns, purification columns, containers, reactors, and other articles and items. The operating temperature of the monolithic gas-sensing chip assemblies can range from −85 degrees Celsius to 380 degrees Celsius.

Figure 4:
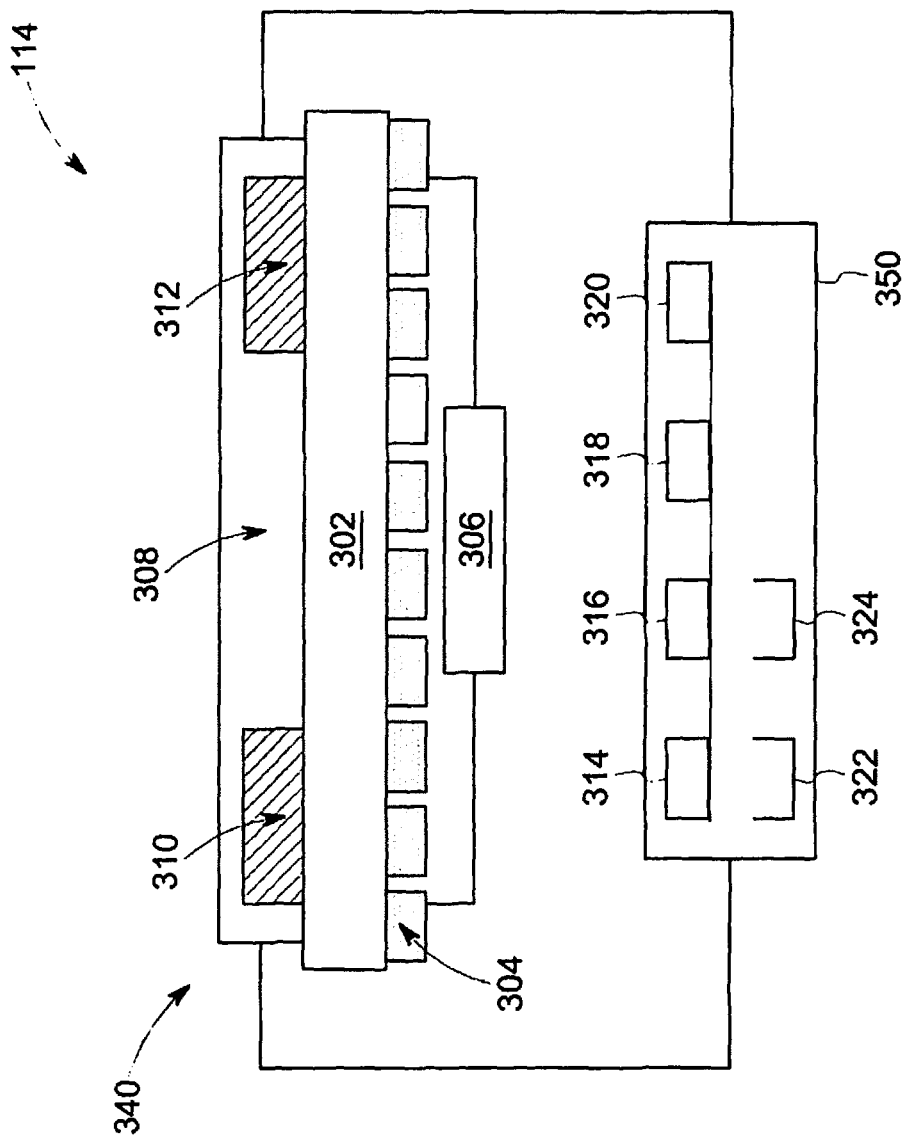
FIG. 4 illustrates a sensor in accordance with one embodiment.

FIG. 4 illustrates one embodiment of the gas sensing assembly or gas sensor 114. The sensor 114 may represent another version of the sensors or sensing systems described herein. The sensor 114 includes a sensing element 340 having a substrate 302, such as a dielectric material, a sensing film or sensing material 308 that is coupled to the substrate 302, and electrodes 310, 312. The sensing material 308 is exposed to, in contact with, in indirect contact with, or the like, at least one analyte gas. One or several heating elements 304, such as high resistance bodies, are coupled to a different side of the substrate 302 relative to the sensing material 308. Alternatively, the sensing system 300 may be devoid the substrate 302 and the metal oxide film of the sensing material 308 may be coupled directly with the heating element 304.

The heating elements 304 receive electric current from a heater controller 306, which represents hardware circuitry that conducts the heater current or voltage to the heating elements 304 to control a temperature of the substrate 302 and to control a temperature of the sensing film or sensing material 308 that is coupled to another side of the substrate 302. For example, in one or more embodiments of the inventive subject matter described herein, the sensing material 308 utilizes a metal oxide sensing film. The sensing material 308 can include one or more materials deposited onto the substrate 302 to perform a function of predictably and reproducibly affecting the impedance sensor response upon interaction with the environment. For example, a metal oxide, such as $SnO_2$, may be deposited as the sensing material 308.

The heating element 304 may be designed as a single element heater, or as multiple elements distributed across the substrate 302. The distributed heating element allows for lower or a reduced amount of current necessary to be driven by the heater controller 306 relative to a single heating element. In one embodiment, the sensing element 340 is heated substantially uniformly to a predetermined operating temperature. In another embodiment, a controlled temperature profile is generated and a sensor output over plural different thermal configurations may be used as a reference. In another embodiment, on chip temperature sensors may be used with the sensor 114 to measure and/or control the temperature of the heating element 304, for sensor response calibration, or the like.

Additionally, the heating element 304 may be a metal layer or may be one or more heating elements that may be used as a heater for the sensor 114. The metal layer of the heating element 304 may constitute an existing interconnect layer on the semiconductor process or may include additional metal deposited to perform the heating function. In one embodiment, the metal may be deposited utilizing sputtering, chemical vapor deposition (CVD) techniques, additive printing, or the like. The shape, size, and/or composition of the heating element 304 is selected to provide target heating characteristics. Optionally, the heating element 304 may be a resistive layer where the materials of the resistive layer may be metal, polymer, nanocomposite, polysilicon, or the like.

The sensing electrodes 310, 312 are coupled with and/or disposed in the sensing material 308 and are connected with the substrate 302 in the illustrated embodiment. The sensing electrodes 310, 312 are conductive bodies that are conductively coupled with sensing circuitry 350. The sensing circuitry 350 includes one or more processors that may be microprocessors, field programmable gate arrays, and/or integrated circuits. The sensing circuitry 350 includes a first impedance system 314, a second impedance system 316, one or more processors for gas responses 318, one or more processors for temperature responses 320, a gas concentration display 322, and a temperature display 324. Each of the first impedance system 31 and/or the second impedance system 316 may include one or more processors that include one or more microprocessors, field programmable gate arrays, and/or integrated circuits. Optionally, the first and second impedance systems 314, 316 may be a combined impedance system.

The heating elements 304 are coupled with the sensing material 308 to control a temperature of the sensing material 308. The sensing circuitry 350 is coupled with the sensing material 308. The sensing circuitry 350 is configured to measure one or more electrical responses of the sensing system to an alternating electrical current applied to the sensing system at one or more of: (a) one or more different frequencies or different frequency ranges; or (b) one or more different resistor-capacitor configurations of the sensing system.

Suitable interdigital electrode structures for probing a fluid sample include two- and four-electrode structures. Suitable materials for electrodes include stainless steel, platinum, gold, noble metals, and others. Suitable electrodes may be formed using metal etching, screen-printing, ink-jet-printing, and mask-based metal deposition techniques. The thickness of fabricated electrodes on the substrates may be in the range from about 10 nanometers to about 1000 micrometers. The materials for the interdigital electrode structures, substrate, sensing layer, and electrode formation methods may be selected based at least in part on the application specific parameters.

In one or more embodiments, the sensing electrodes 310, 312 may be coated with a sensing material that is responsive to one or more analyte gases of interest. The one or more processors of the first impedance system 314 also direct the sensing electrodes 310, 312 to apply an electric field to the sensing material via the electrodes at an alternating current frequency range in the presence of an uncontrolled ambient temperature. The one or more processors of the first impedance system 314 may also receive an electrical signal from the sensing electrodes 310, 312 that represents one or more electrical responses, such as the electrical impedance or impedance response of the sensing element 340 during exposure of the sensing material 308 to the fluid sample. In alternative embodiments, the first impedance system 314 may be referred to as a frequency impedance source and detector system. The first impedance system 314 examines the one or more electrical responses of the sensing element 340 in order to determine the presence and/or amount (e.g., concentration) of one or more analyte gases in the environment to which the sensing material 308 is exposed, as described herein. For example, the first impedance system 314 may provide scanning capability to measure sensor impedance responses at a single or at plural discrete frequencies. Alternatively, the impedance system 314 may provide capability to measure sensor impedance responses across one or more frequency ranges.

Like the first impedance system 314, one or more processors of the second impedance system 316 direct the sensing electrodes 310, 312 to apply the electrical stimuli at an elevated alternating current frequency range. The elevated alternating current frequency range may include one or more discrete frequencies or frequency ranges that may be greater than, or at a higher or more elevated value, than the discrete frequencies or frequency ranges of the alternating current frequency range. The one or more processors of the second impedance system 316 may also receive an electrical signal from the sensing electrodes 310, 312 that represent one or more electrical responses of the sensing element 340 during exposure of the sensing material 308 to the fluid sample. For example, the second impedance system 316 examines the electrical impedance of the sensing element 340 in order to determine the presence and/or amount of one or more analyte gases in the environment to which the sensing material 308 is exposed.

In one or more embodiments, the first and second impedance systems 314, 316 may have one or more common processors that may receive the electrical signals representing the one or more electrical responses of the sensing material 308 to both the alternating current frequency range and/or the elevated alternating frequency range. Optionally, the sensor 114 may include a third impedance system (not shown), that may direct the electrodes 310, 312 to apply electrical stimuli at a third frequency or third alternating current frequency range that may be higher than the elevated current frequency or frequency range, and higher than the first frequency or frequency range. Optionally, a single impedance system may direct the electrodes 310, 312 to apply the electrical stimuli at the first alternating current frequency range, the elevated alternating current frequency range, and the even more elevated third alternating current frequency range. The one or more processors of the single impedance system may receive the plural different electrical responses responsive to the electrodes applying the electrical stimuli at the first, second, and third frequency ranges. Additionally, the one or more processors of the single impedance system may examine the first, second, and third electrical responses to determine the presences and/or amount of the analyte gases in the fluid sample.

Alternatively, the sensing circuitry can measure one or more electrical responses of the sensing material responsive to applying the electric field at the first alternating current frequency range and at the second alternating current frequency range, where the first alternating current frequency range is lower than or less than, or equal to or less than, the second alternating current frequency range.

Figure 5:
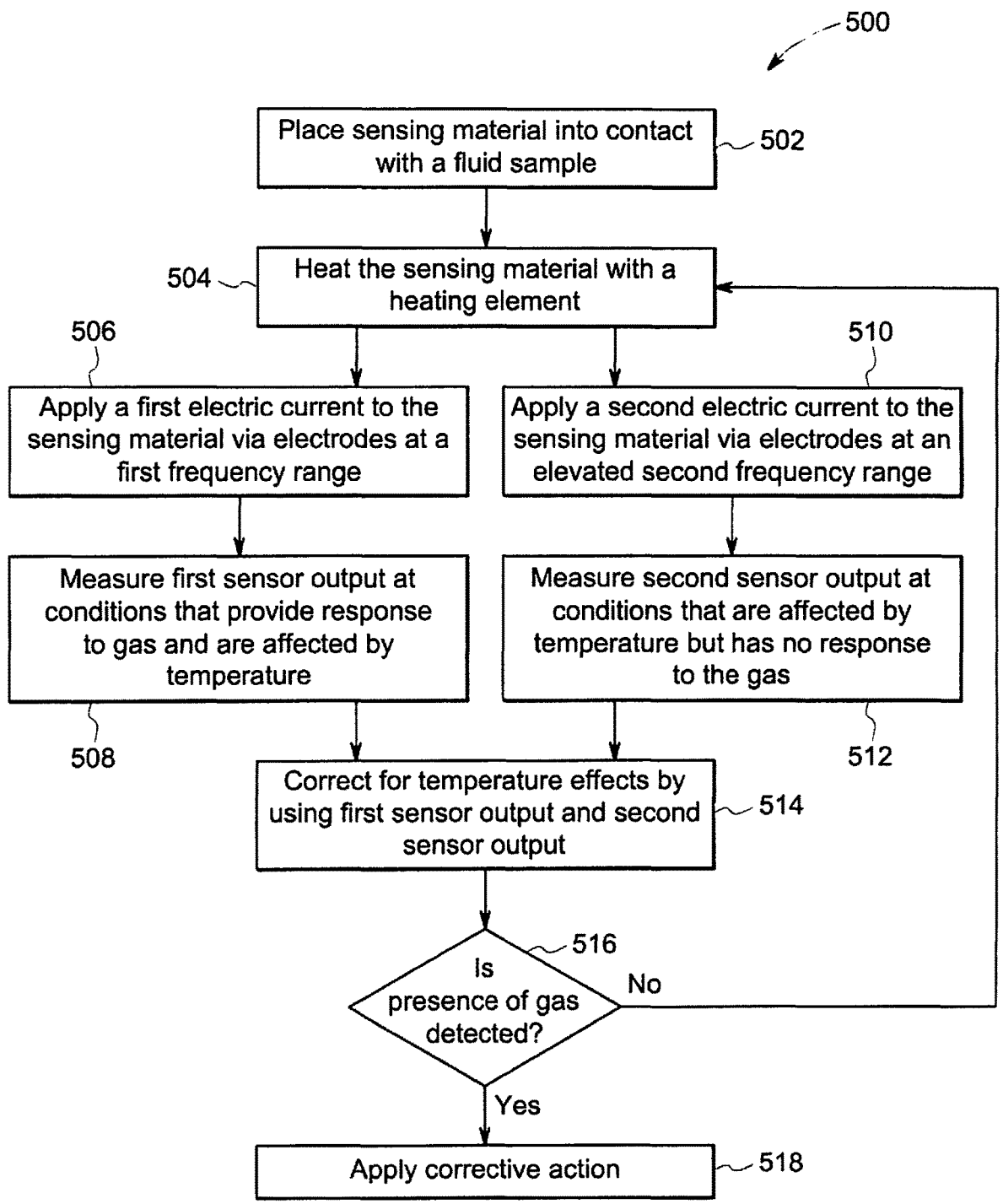
FIG. 5 illustrates a flow chart of one embodiment of a method for improved accuracy of determining a gas at different ambient temperatures, in accordance with one embodiment.

FIG. 5 illustrates a flow chart of one embodiment of a method 500 for improved accuracy of determining a gas at different ambient temperatures, in accordance with one embodiment. The method 500 can represent the operations performed by the sensor system 100, the gas sensing assembly 114, and the sensing element 340 described herein, or optionally can represent the operations performed by another sensing system and/or another gas sensor. For example, the method 500 can represent operations performed by the sensor system 100, the gas sensing sensor 114, and/or the sensing element 340 under direction of one or more software applications, or optionally can represent an algorithm useful for writing such software applications.

In one or more embodiments, the one or more electrical responses of the sensing element to an alternating electrical current or an alternating current at a certain frequency range applied to the sensing element may be measured as different electrical properties. Nonlimiting examples of these measured different electrical responses of the sensing element to the alternating electrical current may include impedance, admittance, reactance, susceptance, of the like. In the present specification, several of the examples of the responses are given as impedances, however, other electrical responses of the sensing element to the alternating electrical current may be produced in addition to or alternative to the impedance responses.

At 502, the sensor 114 including the sensing material 308 is placed into contact with a fluid sample. The fluid sample may contain one or more gas analytes of interest. At 504, the heater controller 306 directs the heating element 304 to heat or increase the temperature of the sensing material 308 with the heating element 304.

At 506, one or more processors of the sensing circuitry 350 directs the first impedance system 314 to apply a first electric current to the sensing material via the electrodes 310, 312. The first electric current may be at a first frequency, a first frequency range, a first alternating current frequency range, or the like. For example, referring to FIG. 2, the first frequency may be indicated by a line 256 that is proximate to the high-frequency shoulder of the dielectric relaxation spectrum of the imaginary part of the impedance Z". Alternatively, not shown in FIG. 2, the first frequency may be proximate to the low-frequency shoulder of the dielectric relaxation spectrum of the imaginary part of the impedance Z". At 508, a first sensor output, such as a first impedance response of the sensing material 308 to the fluid sample, is measured by the one or more processors of the sensing circuitry 350. The first electrical response of the sensing material 308 to a concentration of the fluid may include an impedance response to the gas and is affected by the uncontrolled ambient temperature.

Figure 3:
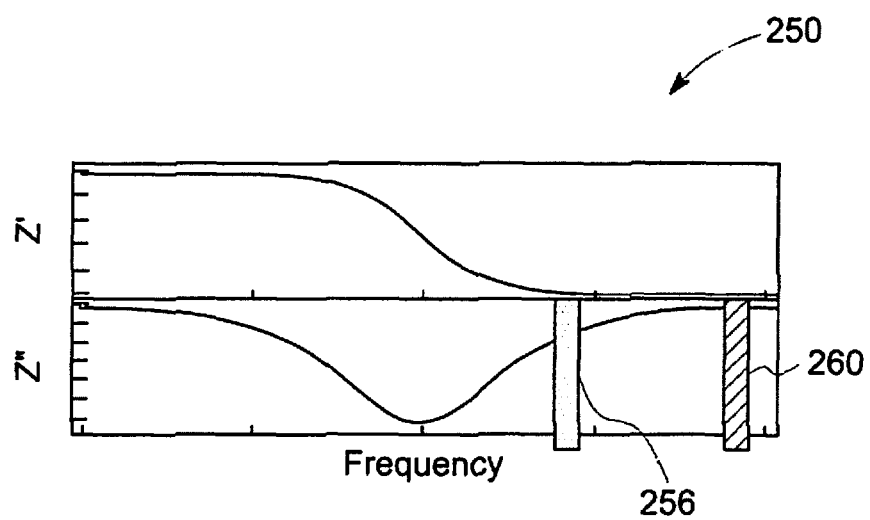
FIG. 3 illustrates a graph of a measured response corresponding to an impedance response of a sensor at a second frequency, in accordance with one embodiment.

Subsequently, substantially simultaneously or prior to the step 506, at 510, one or more processors of the sensing circuitry 350 directs the second impedance system 316 to apply a second electric current to the sensing material 308 via the electrodes 310, 312. The second electric current may be at a second frequency, a second frequency range, an elevated alternating current frequency range, or the like. The second frequency or second frequency range may be greater than or elevated relative to the first frequency or first frequency range. For example, referring to FIG. 3, the first frequency or first frequency range may be indicated by the line 256 that is proximate to the high-frequency shoulder of a dielectric relaxation spectrum of the imaginary part of the impedance Z". For example, the line 256 associated with the first frequency of the shoulder of the dielectric relaxation spectrum of the imaginary part of the impedance Z", may be substantially equal to 0.56 MHz, 1.5 MHz, among other frequencies. Optionally, the one or more processors may measure a real part of an impedance of the first electrical response at the high-frequency shoulder of the dielectric relaxation spectrum. Additionally, the second frequency, the second frequency range, or the elevated alternating current frequency range may be indicated by a line 260 that is elevated, greater than, or the like, the line 256. For example, the line 260 associated with the second frequency may be substantially equal to 2.7 MHz, 6.5 MHz, among other frequencies. The first and second frequency ranges (e.g., the lines 256 and 260 respectively) may be size (e.g., narrow or broad) that may extend between a fraction of a Hz, between less than 1 Hz and 10 Hz, between less than 1 Hz and 50 Hz, between less than 1 Hz and 100 Hz, between less than 10 Hz and 1,000 Hz, between less than 1,000 Hz and 10,000 Hz, or the like. In one or more embodiments, the first frequency range may be narrower or broader than the second frequency range, or the first and second frequency ranges may be substantially the same widths.

At 512, a second sensor output, such as a second electrical response of the sensing material 308 to the fluid sample, is measured by the one or more processors of the sensing circuitry 350. The second electrical response of the sensing material 308 to a concentration of the fluid may include a response to the temperature but does not have a response to the gas. For example, at the elevated second frequency or second frequency range, the impedance response of the sensor is affected by the uncontrolled ambient temperature, but the second electrical response is not affected by the gas. Alternatively, at the lower or reduced first frequency or first frequency range, the impedance response of the sensor is not affected by the uncontrolled ambient temperature.

Alternatively, the sensor impedance response (for example, the sensor output) at two or more predetermined frequencies may be used as a diagnostic indicator for sensor performance affected by temperature. For example, the sensor output at an at least first frequency produces a response to the gas and to ambient temperature. The sensor output at an at least second frequency does not produce a response to the gas but responds only to temperature. A mathematical correction can be applied to the first and second responses based on sensor outputs on the at least first and second frequencies on the response of the sensor for the correction for ambient temperature. Nonlimiting examples of the mathematical correction can include division, subtraction, linearization, and the like. Alternatively, the real and imaginary parts of the sensor impedance response Z' and Z", at a certain predetermined frequency range, can be appreciably not affected by ambient temperature.

Figure 6:
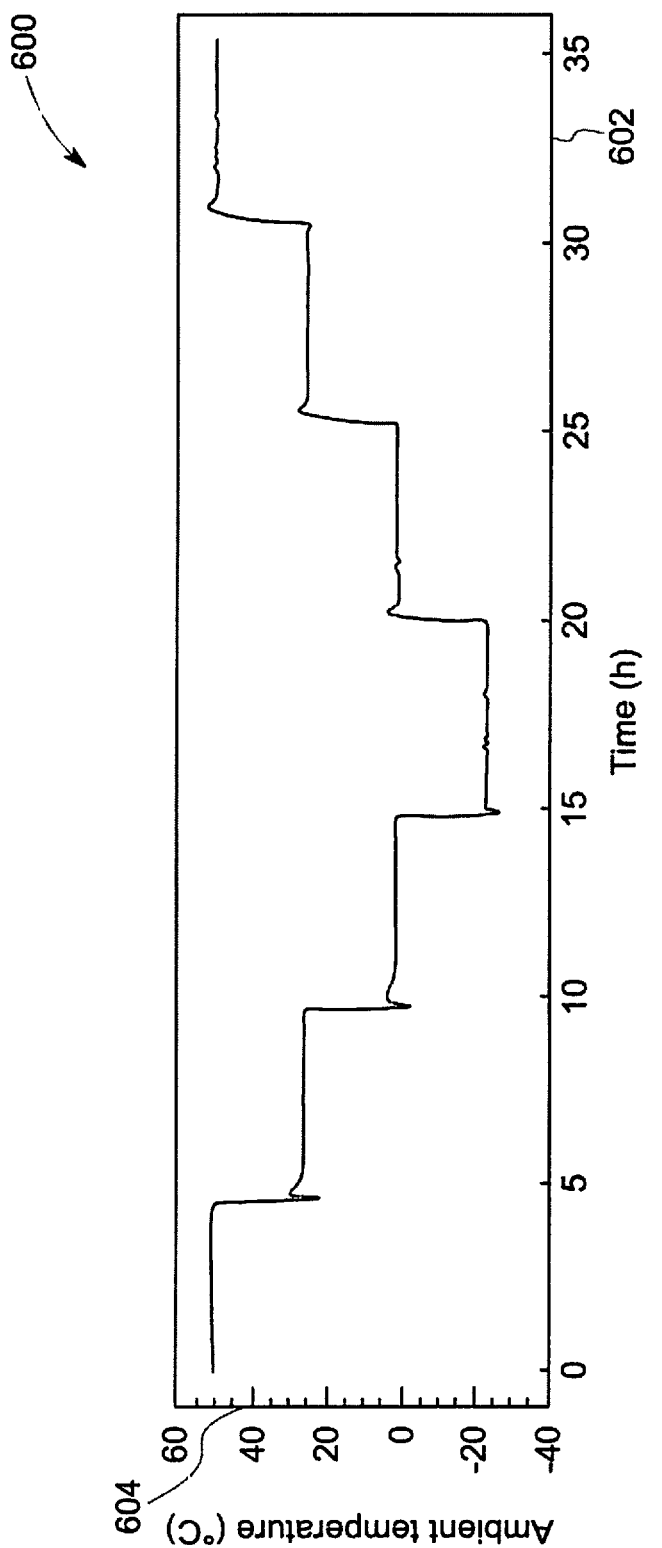
FIG. 6 illustrates a graph of a response of an independent temperature sensor to cycling of ambient temperature, in accordance with one embodiment.

For example, FIG. 6 illustrates a graph of the response of an independent temperature sensor to cycling of ambient temperature, in accordance with one embodiment. This independent temperature sensor may be a thermocouple positioned in an environmental chamber. The response of the independent temperature sensor to temperature is shown alongside a vertical axis 604 representative of the ambient temperature and a horizontal axis 602 representative of time. The independent temperature sensor may be tested in an environmental chamber with cycling of ambient temperatures with set values of about 50° C., 25° C., 0° C., −25° C., 0° C., 25° C., and 50° C. A gas sensor can be positioned in the environmental chamber near the independent temperature sensor. Alternatively, FIGS. 7 through 10 illustrate responses of the gas sensor 114 of this invention positioned in the environmental chamber. For example, FIGS. 7 through 10 illustrate responses of the gas sensor 114 in the presence of a controlled ambient temperature of the environmental chamber. Optionally, FIGS. 7 through 10 may represent responses of the gas sensor 114 in the presence of uncontrolled ambient temperature and/or ambient humidity outside of an environmental chamber.

Figure 7:
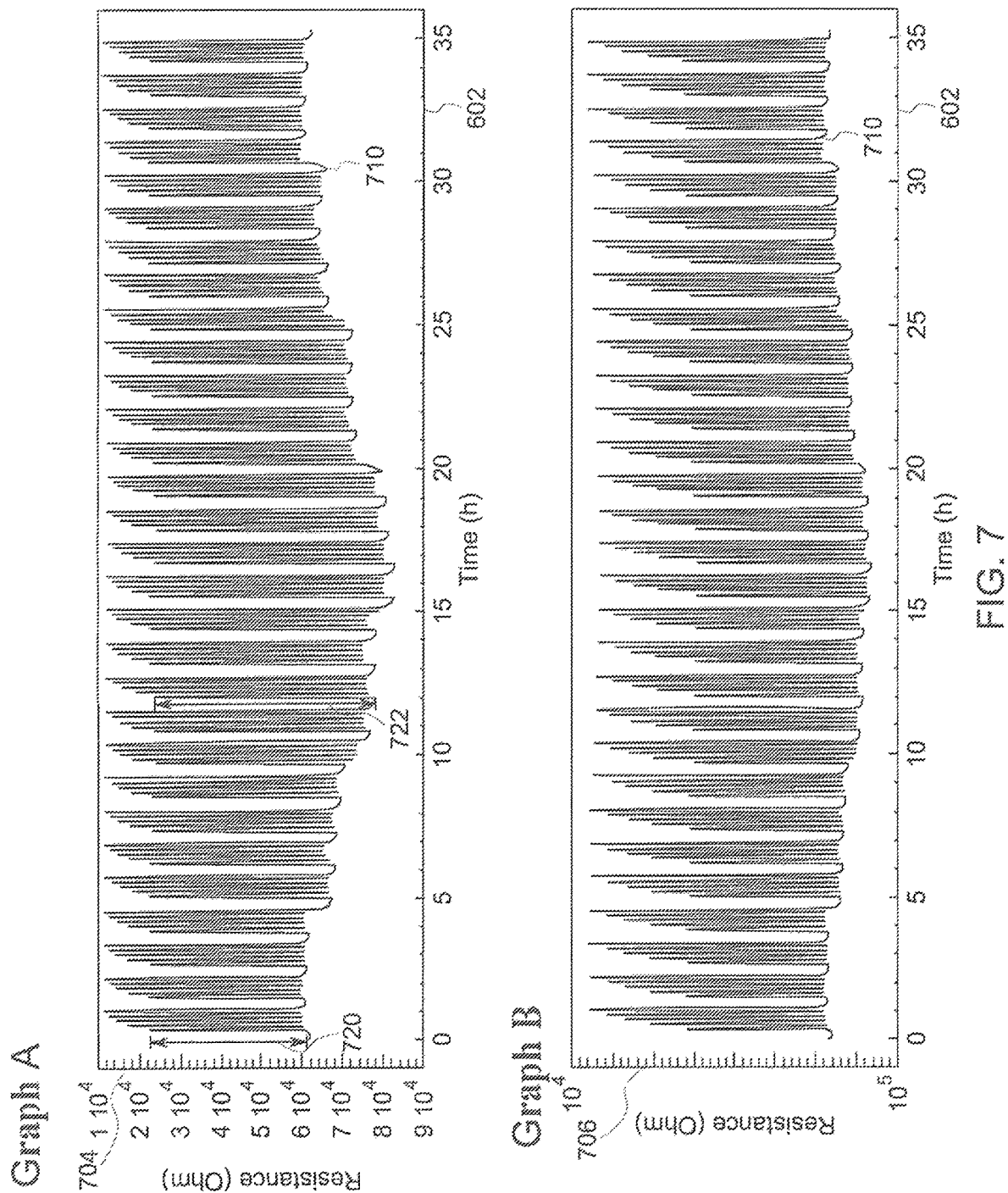
FIG. 7 illustrates graphs of responses of the sensor exposed to concentrations of methane with the cycling of ambient temperatures as illustrated in FIG. 6, in accordance with one embodiment.

FIG. 7 illustrates graphs of responses of the gas sensor exposed to concentrations of methane with the cycling of the ambient temperature as illustrated in FIG. 6. For example, Graphs A and B illustrate a resistance response of the sensor 114 to replicate steps of methane concentrations over the temperature cycling of ambient air temperature. The gas concentrations of methane may include about 50 ppm, 100 ppm 150 ppm, 200 ppm, and 250 ppm. The resistance response illustrated in Graph A is shown alongside the horizontal axis 602 representative of time, and a vertical axis 704 representative of a linear scale of the resistance sensor response. Alternatively, the resistance response illustrated in Graph B is shown alongside the horizontal axis 602 representative of time, and a vertical axis 706 representative of a logarithmic scale of the resistance sensor response. As illustrated by Graphs A and B, a baseline 710 of the resistance response of the sensor 114 was affected by the ambient temperature in the environmental chamber around the sensor 114. For example, a first distance 720 between the baseline 710 and a first point of the sensor response varies from a second distance 722 between the baseline 710 and a second point of the sensor response. Additionally, the resistance response illustrated on the linear scale and the resistance response illustrated on the logarithmic scale illustrates that the resistance responses were affected by the ambient temperature in the environmental chamber.

Figure 8:
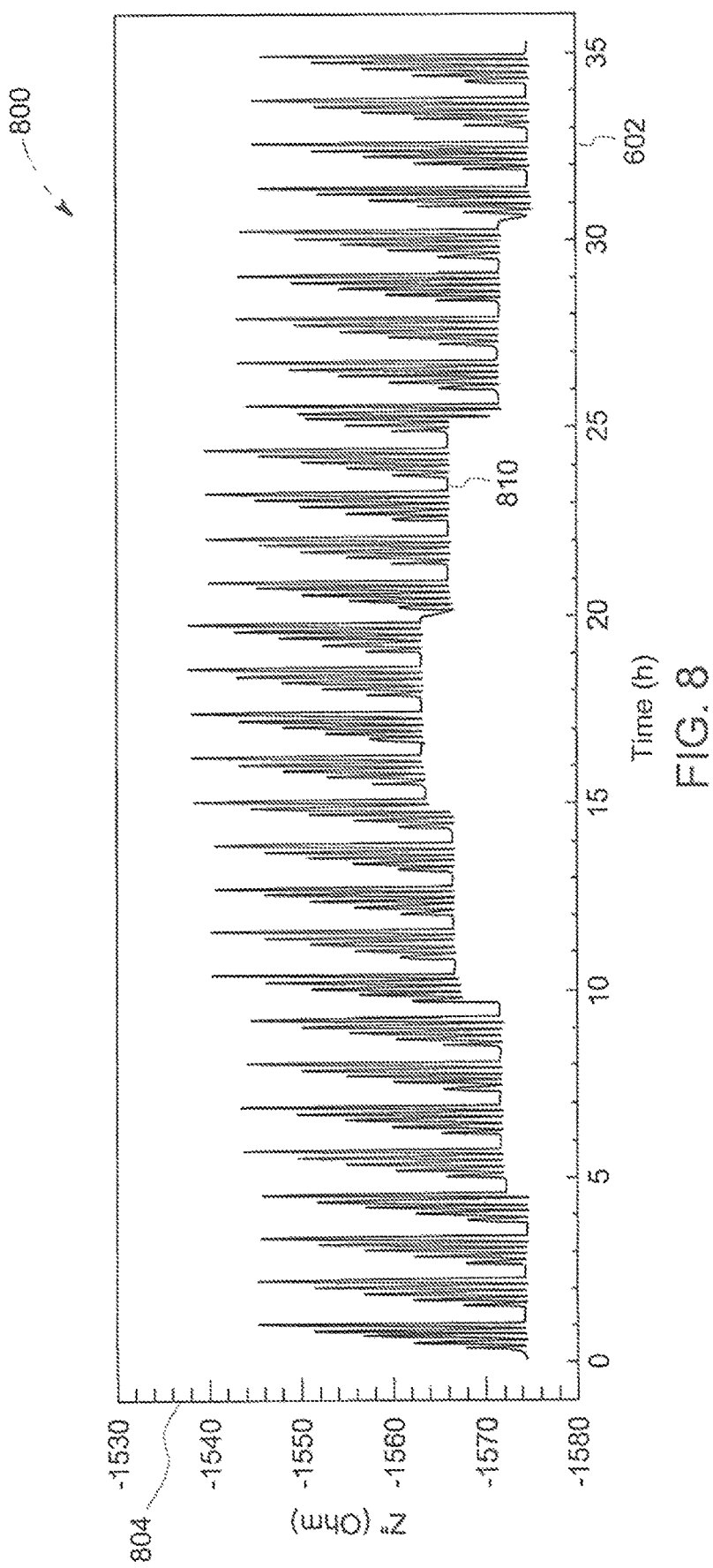
FIG. 8 illustrates a graph of an impedance response of the sensor exposed to concentrations of methane at a first frequency, in accordance with one embodiment.

FIG. 8 illustrates a graph 800 of an impedance response of the sensor exposed to methane at different concentrations.

For example, the impedance response is shown alongside the horizontal axis 602 representative of time, and a vertical axis 804 representative of the imaginary part Z" of the impedance response. In the illustrated example, one of the first or second impedance systems 314, 316 may direct the electrodes 310, 312 to apply a frequency of about 0.56 MHz to the sensing material 308 when the sensing material is in the presence of the controlled ambient temperature in the environmental chamber. The graph 800 illustrates the impedance response of the sensor 114 at the first frequency of 0.56 MHz. Graph 800 illustrates an improved linearity of the sensor response relative to resistance responses shown in Graphs A and B in FIG. 7. Additionally, a baseline 810 that varies over time indicates that the impedance response of the sensor 114 is affected by changes in the ambient temperature.

Figure 9:
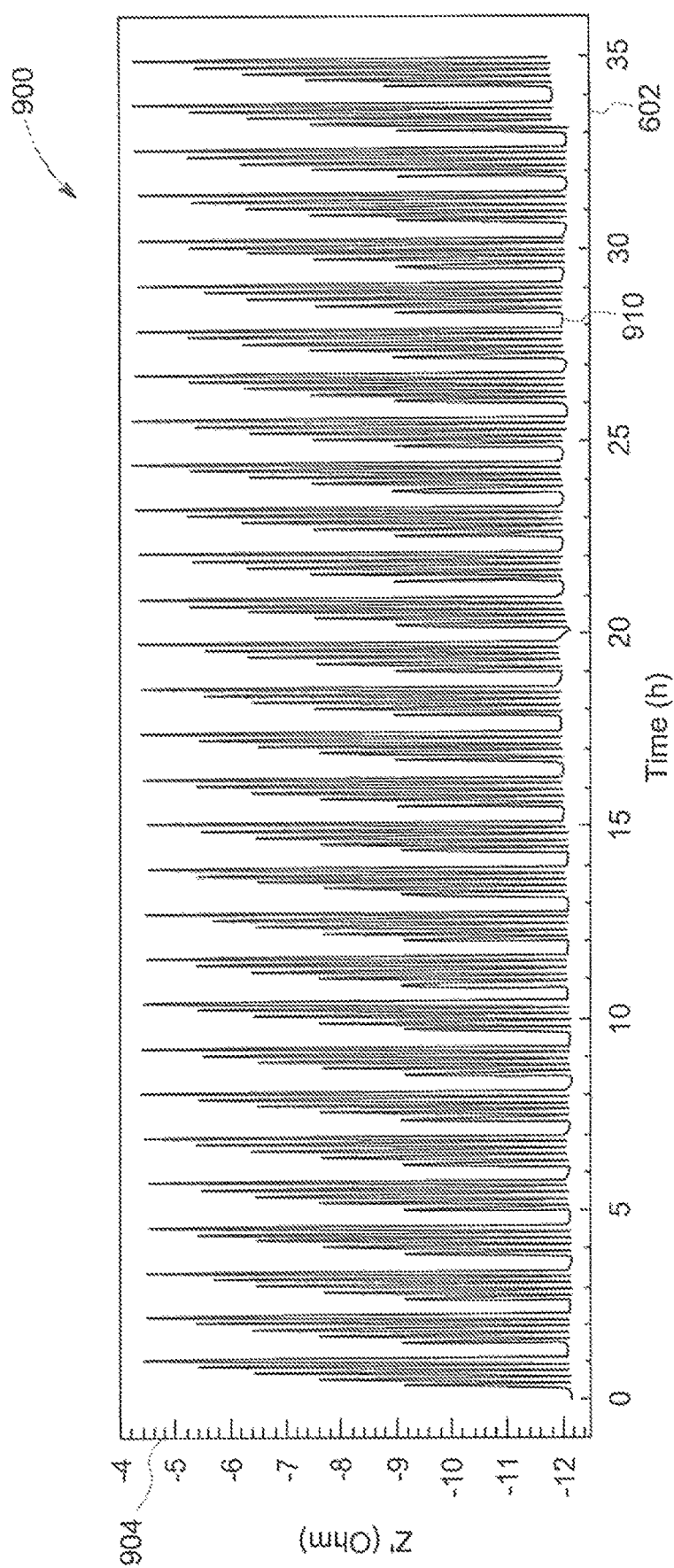
FIG. 9 illustrates a graph of an impedance response of the sensor exposed to concentrations of methane at an elevated second frequency, in accordance with one embodiment.

FIG. 9 illustrates a graph 900 of an impedance response of the sensor exposed to methane at different concentrations. For example, the impedance response is shown alongside the horizontal axis 602 representative of time, and a vertical axis 904 representative of the real part Z' of the impedance response. In the illustrated example, one of the first or second impedance systems 314, 316 may direct the electrodes 310, 312 to apply a second frequency of about 2.7 MHz to the sensing material 308. For example, the second frequency 2.7 MHz is greater or elevated relative to the first frequency 0.56 MHz. The graph 900 illustrates the impedance response of the sensor 114 at the second frequency 2.7 MHz. The graph 900 includes a baseline 910 that is substantially uniform over time regardless of the value of the ambient temperature in the environmental chamber. For example, the graph 900 illustrates that at the elevated second frequency, elevated second frequency range, or elevated alternating current frequency range, the temperature effects were substantially suppressed. For example, the impedance response is almost a pure or substantially pure response to the methane gas and the electrical response is not affected by the ambient temperature.

In one or more embodiments, one of the first or second impedance systems 314, 316 may also measure a third electrical response of the sensing material 308 to the alternating current frequency range applied to the sensing material 308 via the electrodes 310, 312. The third electrical response may include a response to the gas that is substantially linear. Additionally, the response may be proportional to the ambient temperature.

Returning to FIG. 5, at 514, the impedance response is corrected for temperature effects by using the first sensor output (e.g., the response of graph 800) and the second sensor output (e.g., the response of graph 900). For example, the sensing circuitry is configured to detect the ambient temperature based on a difference between a first electrical response and a second electrical response. The one or more processors may measure the ambient temperature of the environmental chamber surrounding the sensing material 308 or proximate to the sensing material 308 based on one of the electrical responses not being affected by the gas, but being affected by the ambient temperature.

Optionally, the one or more processors may determine a temperature effect on a first electrical response of one or more electrical responses due to the ambient temperature based on a difference between the first electrical response and one or more other electrical responses, such as other electrical responses of the sensing material 308 from alternating currents applied to the sensing material 308 at different and/or elevated frequency ranges. For example, the one or more processors may correct the first electrical response of the sensing material to exposure of one or more other fluids based on the difference between the first electrical response and the one or more other electrical responses. Optionally, the one or more processors may combine the first electrical response and the one or more other electrical responses to determine a concentration of the gas in the fluid sample in the presence of the ambient temperature based on a combination of the first electrical response and the one or more other electrical responses.

Figure 10:
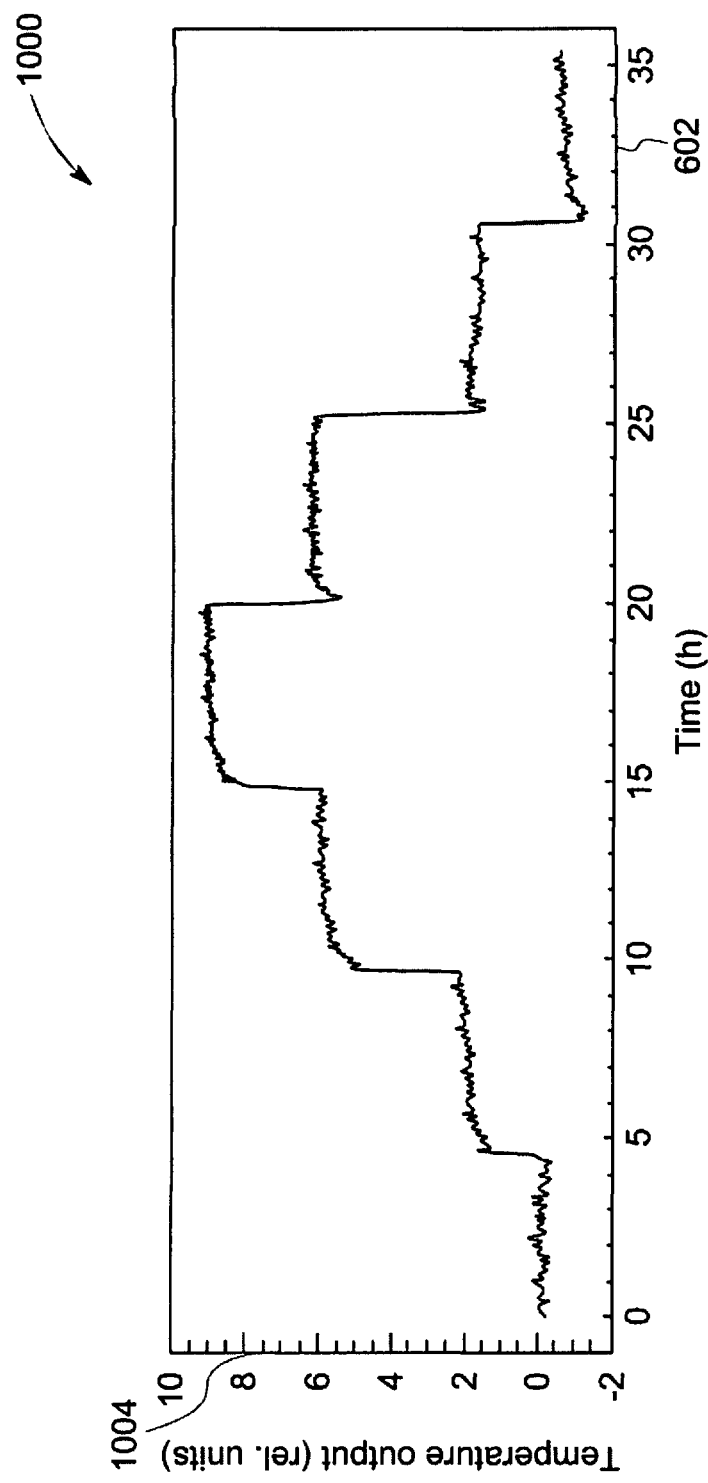
FIG. 10 illustrates a graph of a corrected response of the sensor, in accordance with one embodiment.

FIG. 10 illustrates one examples of a graph 1000 of a corrected response of the sensor output. In the example, a first impedance response was responsive to a first frequency of about 1.5 MHz applied to the sensing material, and a second impedance response was responsive to a second frequency of about 6.5 MHz applied to the sensing material. The one or more processors of the sensing circuitry 350 measure the ambient temperature based on a difference between the first impedance response and the second impedance response. The temperature response is shown alongside the horizontal axis 602 representative of time, and a vertical axis 1004 representative of temperature. The graph 1000 illustrates that by combining the imaginary parts Z" of the impedance responses to the first and second frequencies (e.g., 1.5 MHz and 6.5 MHz), that the gas response is substantially suppressed and the impedance response is almost a pure or substantially pure response to the temperature. For example, the sensing circuitry 350 determines a temperature effect on the second impedance response (e.g., at the 6.5 MHz frequency) due to the ambient temperature based on a difference between the first impedance response (e.g., at the 1.5 MHz) and the second impedance response (e.g., at the 6.5 MHz frequency).

For example, the sensor 114 outputs a first impedance response responsive to the first frequency or first frequency range applied to the sensing material, wherein the response includes a response to the gas but the response is not affected by controlled and/or uncontrolled ambient temperature. Additionally, the sensor 114 unexpectantly outputs a second impedance response responsive to the elevated second frequency or second frequency range applied to the sensing material, wherein the second response includes a response to the ambient temperature but is not affected by the gas. Furthermore, by combining the first and second responses to correct for the temperature effects, the sensor 114 unexpectantly outputs a third response where the response to the gas is substantially linear and almost suppressed, and the sensor has a substantially pure temperature response. For example, the third response is proportional to the ambient temperature.

In one or more embodiments, the sensor 114 may output a first impedance response responsive to a measurement at a first frequency and may output a second impedance response responsive to a measurement at a higher second frequency. The one or more processors may correct or adjust the first impedance response (e.g., at the lower first frequency) based on the second impedance response (e.g., at the higher frequency). In another embodiment, the first impedance response may be responsive to a measurement at a first frequency within a frequency range, and the second impedance response may be responsive to a measurement at an elevated second frequency also within the frequency range. Optionally, the first impedance response may be responsive to a measurement at a first frequency to a measurement lower than and outside of a frequency range, and the second impedance response may be responsive to a measurement at a second frequency that is greater than the first frequency and is within the frequency range.

Optionally, the sensing circuitry 350 may also measure one or more third impedance responses of the sensing material to exposure of one or more other fluids based on the difference between the first impedance response and the second impedance response. Optionally, the sensing circuitry 350 may combine the first impedance response and the second impedance response to determine a concentration of the gas in the fluid sample based on a combination of the first and second impedance responses.

Returning to FIG. 4, the sensor 114 also includes a gas concentration display 322 and a temperature display 324. For example, the displays may be a digital screen that may display text to indicate a determined gas concentration and temperature. Optionally, the display may be a line graph indicating an increasing or decreasing gas concentration and/or temperature, may be a light indicator that may turn on if the determined concentration of gas exceeds a predetermined threshold, or if the measured temperature exceeds a predetermined threshold, or any combination therein. For example, the displays 322, 324 may be any indicator to an operator of the sensor system 100.

Returning to FIG. 5, at 516, if the one or more processors of the sensing circuitry 350 detects the presence of a gas in the fluid sample based on the impedance responses, and/or determines that an amount of the gas present exceeds a predetermined threshold or is outside of a predetermined threshold range, then flow of the method 500 proceeds to 518 where a correction action is applied. For example, the corrective action outcomes may include diagnostics, prognostics, observing, reporting, controlling, or any other outcome. If the sensing circuit 350 determines that an amount of methane present does not exceed a predetermined threshold, or is within the predetermined threshold range, then flow of the method 500 returns to 504 and the sensor 114 continues to monitor the environment in which the sensor is disposed.

In one or more embodiments of the subject matter described herein, a gas sensing assembly includes a sensing material to be placed in contact with a fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at an elevated alternating current frequency range. The sensing circuitry measures one or more electrical responses of the sensing material responsive to applying the electric field at the alternating current frequency range and at the elevated alternating current frequency range. The sensing circuitry detects presence of a gas in the fluid sample based on the one or more electrical responses.

Optionally, the sensing circuitry is configured to measure a first electrical response of the one or more electrical responses of the sensing material to the alternating current frequency range applied to the sensing material where the first electrical response is not affected by the uncontrolled ambient temperature.

Optionally, the sensing circuitry is configured to control application of the electric field to the sensing material via the electrodes at a shoulder of a dielectric relaxation spectrum.

Optionally, the sensing circuitry is configured to control application of the electric field to the sensing material via the electrodes at a high-frequency shoulder of a dielectric relaxation spectrum.

Optionally, the sensing circuitry is configured to measure a real part of an impedance of the first electrical response at the high-frequency shoulder of the dielectric relaxation spectrum.

Optionally, the sensing circuitry is configured to measure a second electrical response of the one or more electrical responses of the sensing material to the alternating current frequency range applied to the sensing material where the second electrical response is not affected by the gas but is affected by the uncontrolled ambient temperature.

Optionally, the sensing circuitry is configured to measure a third electrical response of the one or more electrical responses of the sensing material to the alternating current frequency range applied to the sensing material where the third electrical response to the gas is linear and is proportional to the uncontrolled ambient temperature.

Optionally, the sensing circuitry is configured to measure the one or more electrical responses of the sensing material to the alternating current frequency range applied to the sensing material as indicative of a concentration of the gas in the fluid sample.

Optionally, the sensing circuitry is configured to detect the uncontrolled ambient temperature based on a difference between a first electrical response and a second electrical response of the one or more electrical responses.

Optionally, the sensing circuitry is configured to measure the uncontrolled ambient temperature based on one of the one or more electrical responses not being affected by the gas but being affected by the uncontrolled ambient temperature.

Optionally, the sensing circuitry is configured to determine a temperature effect on a first electrical response of the one or more electrical responses due to the uncontrolled ambient temperature based on a difference between the first electrical response and one or more other electrical responses.

Optionally, the sensing circuitry is configured to correct the first electrical response of the sensing material to expose of one or more other fluids based on the difference between the first electrical response and the one or more other electrical responses.

Optionally, the sensing circuitry is configured to combine the first electrical response and the one or more other electrical responses to determine a concentration of the gas in the fluid sample in the presence of the uncontrolled ambient temperature based on a combination of the first electrical response and the one or more other electrical responses.

In another embodiment of the subject matter described herein, a method includes placing a sensing material into contact with a fluid sample. A temperature of the sensing material is controlled via a heating element while the sensing material is in contact with the fluid sample. An electric field is applied to the sensing material via the electrodes at an elevated alternating current frequency range. One or more electrical responses of the sensing material are measured responsive to applying the electric field at the alternating current frequency range and at the elevated alternating current frequency range. The presence of a gas in the fluid sample is detected based on the one or more electrical responses.

Optionally, measuring the one or more electrical responses also includes measuring a first electrical response of the one or more electrical responses of the sensing material to the alternating current frequency range applied to the sensing material where the first electrical response is not affected by the uncontrolled ambient temperature.

Optionally, the method also includes controlling application of the electric field to the sensing material via the electrodes at a high-frequency shoulder of the dielectric relaxation spectrum.

Optionally, the method also includes measuring a real part of an impedance of the first electrical response at the high-frequency shoulder of the dielectric relaxation spectrum.

Optionally, measuring the one or more electrical responses includes measuring a second electrical response of the one or more electrical responses of the sensing material to the alternating current frequency range applied to the sensing material where the second electrical response is not affected by the gas but is affected by the uncontrolled ambient temperature.

Optionally, measuring the one or more electrical responses includes measuring a third electrical response of the one or more electrical responses of the sensing material to the alternating current frequency range applied to the sensing material wherein the third electrical response to the gas is linear and is proportional to the uncontrolled ambient temperature.

Optionally, detecting the presence of the gas includes measuring a concentration of the gas in the fluid sample based on the one or more electrical responses.

Optionally, the method also includes detecting the uncontrolled ambient temperature based on a difference between a first electrical response and a second electrical response of the one or more electrical responses.

Optionally, the method also includes measuring the uncontrolled ambient temperature based on one of the one or more electrical responses not being affected by the gas but being affected by the uncontrolled ambient temperature.

Optionally, the method also includes determining a temperature effect on a first electrical response of the one or more electrical responses due to the uncontrolled ambient temperature based on a difference between the first electrical response and one or more other electrical responses.

Optionally, the method also includes correcting the first electrical response of the sensing material to exposure of one or more other fluids based on the difference between the first electrical response and the one or more other electrical responses.

Optionally, the method also includes combining the first electrical response and the one or more other electrical responses, and determining a concentration of the gas in the fluid sample based on a combination of the first electrical response and the one or more other electrical responses.

In another embodiment of the subject matter described herein, a method includes placing a sensing material into contact with a fluid sample. A temperature of the sensing material is controlled via a heating element while the sensing material is in contact with the fluid sample. An electric field is applied to the sensing material via the electrodes at an elevated alternating current frequency range. One or more electrical responses of the sensing material are measured responsive to applying the electric field at the alternating current frequency range and at the elevated alternating current frequency range. A concentration of the gas in the fluid sample is measured based on the one or more electrical responses.

In another embodiment of the subject matter described herein, a gas sensing assembly includes a sensing material to be placed in contact with a fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at a first alternating current frequency range in the presence of an uncontrolled ambient temperature, and at a second alternating current frequency range. The sensing circuitry measures one or more electrical responses of the sensing material responsive to applying the electric field at the first and second alternating current frequency ranges. The sensing circuitry detects presence of a gas in the fluid sample based on the one or more electrical responses.

In another embodiment of the subject matter described herein, a gas sensing assembly includes a sensing material to be placed in contact with a fluid sample, a gas-permeable filter material separating the sensing material and the fluid sample, electrodes coupled with the sensing material that apply an electric field to the sensing material across the electrodes, a heating element that controls a temperature of the sensing material while the sensing material is in contact with the fluid sample, and sensing circuitry to control application of the electric field to the sensing material via the electrodes at an alternating current frequency range in the presence of an uncontrolled ambient temperature and at a first alternating current frequency range in the presence of an uncontrolled ambient temperature, and at a second alternating current frequency range. The sensing circuitry measures one or more electrical responses of the sensing material responsive to applying the electric field at the first and second alternating current frequency ranges. The sensing circuitry detects presence of a gas in the fluid sample based on the one or more electrical responses.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A gas sensing assembly comprising:
   a sensing material configured to be placed into contact with a fluid sample;
   electrodes coupled with the sensing material and configured to apply an electric field to the sensing material across the electrodes;
   a heating element configured to control a temperature of the sensing material while the sensing material is in contact with the fluid sample; and
   sensing circuitry comprising:
      a first impedance system configured to:
         apply the electric field to the sensing material via the electrodes at a first alternating current frequency range in the presence of an uncontrolled ambient temperature; and
         receive a first electrical response of the sensing material responsive to applying the electric field at the first alternating current frequency ranges;
      a second impedance system configured to:
         apply the electric field to the sensing material via the electrodes at a second alternating current frequency range elevated with respect to the first alternating current frequency range; and
         receive a second electrical response of the sensing material responsive to applying the electric field at the second alternating current frequency range;
      wherein the first impedance system, the second impedance system, or both are configured to:
         determine a temperature effect on the first electrical response based on a difference between the first electric response and the second electrical response;
         adjust the first electrical response based on the temperature effect; and
         detect presence of a gas in the fluid sample based at least on the adjusted first electrical response.

2. The gas sensing assembly of claim 1, wherein the first electrical response is not affected by the uncontrolled ambient temperature.

3. The gas sensing assembly of claim 1, wherein the sensing circuitry is configured to control application of the electric field to the sensing material via the electrodes at a shoulder of a dielectric relaxation spectrum.

4. The gas sensing assembly of claim 1, wherein the sensing circuitry is configured to control application of the electric field to the sensing material via the electrodes at a high-frequency shoulder of a dielectric relaxation spectrum.

5. The gas sensing assembly of claim 4, wherein the sensing circuitry is configured to measure a real part of an impedance of the first electrical response at the high-frequency shoulder of the dielectric relaxation spectrum.

6. The gas sensing assembly of claim 1, wherein the second electrical response is not affected by the gas but is affected by the uncontrolled ambient temperature.

7. The gas sensing assembly of claim 1, wherein the sensing circuitry is configured to measure a third electrical response of the sensing material responsive to applying the electric field to a third alternating current frequency range applied to the sensing material where the third electrical response to the gas is linear and is proportional to the uncontrolled ambient temperature.

8. The gas sensing assembly of claim 1, wherein the sensing circuitry is configured to measure the first electrical response as indicative of a concentration of the gas in the fluid sample.

9. The gas sensing assembly of claim 1, wherein the sensing circuitry is configured to detect the uncontrolled ambient temperature based on the difference between the first electrical response and the second electrical response.

10. The gas sensing assembly of claim 1, wherein the sensing circuitry is configured to measure the uncontrolled ambient temperature based on the second electrical response not being affected by the gas but being affected by the uncontrolled ambient temperature.

11. The gas sensing assembly of claim 1, wherein the sensing circuitry is configured to correct the first electrical response of the sensing material to exposure of one or more other fluids based on the difference between the first electrical response and one or more other electrical responses of the sensing material.

12. The gas sensing assembly of claim 1, wherein the sensing circuitry is configured to combine the first electrical response and the second electrical response to determine a concentration of the gas in the fluid sample in the presence of the uncontrolled ambient temperature based on a combination of the first electrical response and the second electrical response.

13. The gas sensing assembly of claim 1, wherein the sensing circuitry comprises one or more processors associated with the first impedance system, the second impedance system, or both.

14. A gas sensing assembly comprising:
a sensing material configured to be placed into contact with a fluid sample;
electrodes coupled with the sensing material and configured to apply an electric field to the sensing material across the electrodes;
a heating element configured to control a temperature of the sensing material while the sensing material is in contact with the fluid sample; and
sensing circuitry comprising:
  a first impedance system configured to:
    apply the electric field to the sensing material via the electrodes at a first alternating current frequency range in the presence of an uncontrolled ambient temperatures; and
    receive a first electrical response of the sensing material responsive to applying the electric field at the first alternating current frequency range;
  a second impedance system configured to:
    apply the electric field to the sensing material via the electrodes at a second alternating current frequency range; and
    receive a second electrical response of the sensing material responsive to applying the electric field at the second alternating current frequency range;
  wherein the first impedance system, the second impedance system, or both are configured to:
  determine a temperature effect on the first electrical response based on a difference between the first electric response and the second electrical response;
  adjust the first electrical response based on the temperature effect; and
  detect presence of a gas in the fluid sample based at least on the adjusted first electrical response.

15. A gas sensing assembly comprising:
a sensing material configured to be placed into contact with a fluid sample;
a gas-permeable filter material separating the sensing material and the fluid sample;
electrodes coupled with the sensing material and configured to apply an electric field to the sensing material across the electrodes;
a heating element configured to control a temperature of the sensing material while the sensing material is in contact with the fluid sample; and
sensing circuitry comprising:
  a first impedance system configured to:
    apply the electric field to the sensing material via the electrodes at a first alternating current frequency range in the presence of an uncontrolled ambient temperatures; and
    receive a first electrical response of the sensing material responsive to applying the electric field at the first alternating current frequency range;
  a second impedance system configured to:
    apply the electric field to the sensing material via the electrodes at a second alternating current frequency range; and
    receive a second electrical response of the sensing material responsive to applying the electric field at the second alternating current frequency range;
  wherein the first impedance system, the second impedance system, or both are configured to:
  determine a temperature effect on the first electrical response based on a difference between the first electric response and the second electrical response;
  adjust the first electrical response based on the temperature effect; and
  detect presence of a gas in the fluid sample based at least on the adjusted first electrical response.

* * * * *